May 6, 1941.  A. O. SARFF  2,241,367
WEED GUARD
Filed May 24, 1939
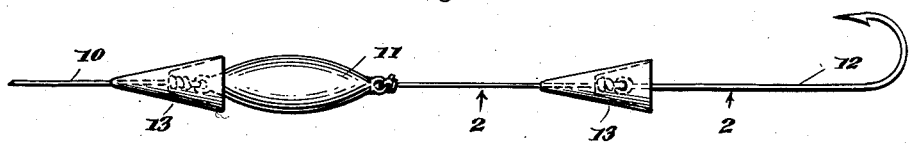
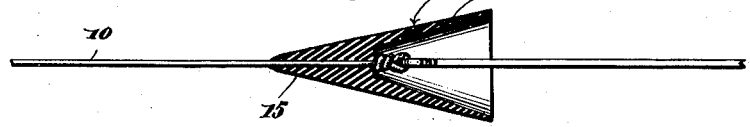
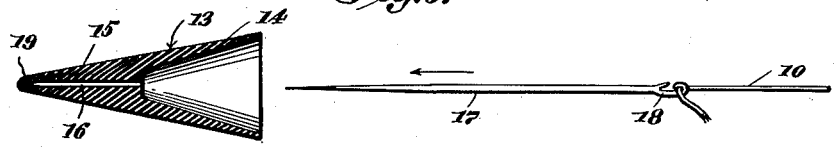
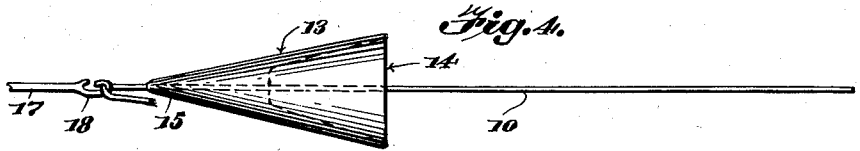
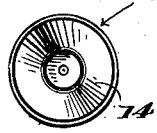
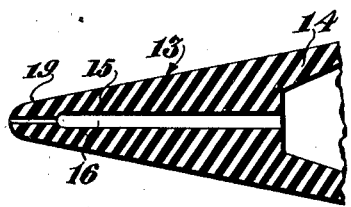
Inventor
AUSTIN O. SARFF
Attorney Patented May 6, 1941

2,241,367

UNITED STATES PATENT OFFICE 2,241,367

WEED GUARD

Austin O. Sarff, Walker, Minn.

Application May 24, 1939, Serial No. 275,515

1 Claim. (Cl. 43—38)

This invention relates to weed guards for fishing tackle, lines, and the like, and has for one of its objects the production of a simple and efficient guard formed of flexible material which will efficiently grip the line to hold the guard in place and which will not be likely to become dented or irregularly-shaped should the same come in contact with foreign objects, in that the flexible nature of the guard will cause the guard to flexibly return to its normal shape after contact with a foreign object.

A further object of this invention is the production of a simple and efficient guard which will efficiently guard and shield the knots and eyes of a sinker, fish hook, and the like.

Other objects and advantages of the present invention will appear throughout the following specification and claim.

In the drawing:

Figure 1 is a side elevational view of a portion of a fishing line showing my improved guard applied thereto;

Figure 2 is a longitudinal sectional view through the guard taken on line 2—2 of Figure 1, showing a portion of a fishing line;

Figure 3 is a longitudinal sectional view through the guard, showing the manner in which the line is threaded therethrough;

Figure 4 is a side elevational view of the guard showing a portion of a fishing line threaded through the guard;

Figure 5 is an end elevational view of the guard looking at the inner end thereof.

Figure 6 is an enlarged fragmentary sectional view through the forward tapering end of the guard.

By referring to the drawing, it will be seen that 10 designates the conventional fishing line to which, for the purpose of illustration, is attached a sinker 11 and a hook 12. My invention resides primarily in the guard indicated by the numeral 13. The guard 13 is preferably formed of rubber or other flexible material in a suitable size. The guard 13 preferably comprises a cone-shaped body having a bell-like skirt portion 14 at its rear end and a tapering apex 15 at its forward end. The bell-like skirt portion 14 is adapted to shield the knots, eyes, and the like, of sinkers, fish hooks, and similar fishing tackle. The knots, eyes, or the like, are adapted to fit within the skirt portion 14 in a manner similar to that shown in Figure 2. The tapering apex 15 of the body 13 is provided with a longitudinally extending line-receiving aperture 16 extending from the bell-like skirt portion 14 to the outer extremity of the apex 15, the outer extremity of the apex 15 being narrowed down to provide a restricted or contracted needle point opening, as shown clearly in Figure 3, whereby the line 10 when passing through the aperture 16 will be firmly gripped by the restricted outer end of the aperture 16 and cause the guard 13 to be firmly anchored in a set position within the aperture 16.

For the purpose of facilitating the passing of the line through the aperture 16, I employ an elongated needle 17 having a single overlapping slotted eye 18 for engaging the end of the line 10 and thereby facilitating the pulling of the line through the aperture 16 when extending the needle through the aperture in the manner as shown in Figures 3 and 4.

From the foregoing description, it will be seen that a very simple and efficient resilient or flexible guard is provided which will efficiently protect and guard, as well as shield, the knots or connection of the line with the fishing tackle, and that the flexible or resilient skirt 14 by overlapping the knots will act as an efficient means for shielding any protrusion on a fishing line from weeds, moss or other substance which would be likely to catch upon the protruding points. The flexible skirt 14 will also retain its normal contour and will immediately flex to its normal contour if struck by a foreign object thereby preventing a permanent distortion or irregular shape, which would be likely to cause a rolling action should the device be pulled rapidly through the water. Due to this flexible character of the body 13, this rolling action will be avoided since the guard will at all times retain its normal cone-like contour and will not be likely to become permanently pressed out of shape or damaged. Furthermore, by contracting the outer end of the aperture 16 at the point indicated by the numeral 19, a fine grip will be provided upon the line 10 to produce an elastic-like gripping action to firmly hold the guard in place without additional securing means and at the same time firmly seal the forward end of the guard around the line 10 and permit the outer side walls of the guard to merge into the length of the outer face of the line and avoid an obstruction at the forward end of the guard.

It should be understood that detail changes may be made in the device without departing from the invention, so long as such changes fall within the scope of the appended claim.

Having described the invention, what is claimed as new is:

A guard of the class described comprising a cone-like body formed of flexible material and having a rearward skirt portion adapted to overhang and shield the knots, eyes and the like of sinkers, hooks and the like carried by a fishing line, said body having a longitudinally extending line-receiving aperture, the outer end of the aperture being reduced in diameter at the apex of the cone-like body to provide an expansible apex to permit a fishing line to be threaded therethrough, the expansible apex being automatically contractible to snugly grip a fishing line as the line passes through the apex with an elastic-like grip for holding the guard in a set position upon the line.

AUSTIN O. SARFF.